United States Patent [19]

Harvey et al.

[11] 4,299,479
[45] Nov. 10, 1981

[54] PHOTOGRAPHIC PRINTER WITH SENSITIVITY CONTROL FOR CLASSIFICATION OF NEGATIVES

[75] Inventors: Ronald B. Harvey; Jan T. Freier, both of Minneapolis, Minn.

[73] Assignee: Pako Corporation, Minneapolis, Minn.

[21] Appl. No.: 186,188

[22] Filed: Sep. 11, 1980

[51] Int. Cl.³ .................... G03B 27/73; G03B 27/80
[52] U.S. Cl. ........................................ 355/38; 355/68
[58] Field of Search ............................. 355/38, 41, 68

[56] References Cited

U.S. PATENT DOCUMENTS 4,168,120  9/1979  Freier et al. .......................... 355/38
4,168,121  9/1979  Freier et al. .......................... 355/38

Primary Examiner—Michael L. Gellner
Attorney, Agent, or Firm—Kinney, Lange, Braddock, Westman and Fairbairn

[57] ABSTRACT

A photographic printer includes a sensor system for measuring the optical characteristics of each photographic film frame to be printed at a plurality of defined areas. Based upon the measured optical characteristics, the printer identifies and classifies the film frames into various types of scenes. The exposures used in printing each film frame depend upon the classification of that film frame. A user-selectable control permits the user to vary the sensitivity of the classification of one or more of the types of scenes in essentially a linear fashion.

19 Claims, 4 Drawing Figures

PHOTOGRAPHIC PRINTER WITH SENSITIVITY CONTROL FOR CLASSIFICATION OF NEGATIVES

BACKGROUND OF THE INVENTION

1. Field of the Invention

The present invention relates to photographic printers. In particular, the present invention relates to a photographic printer which automatically identifies and classifies film frames containing certain types of scenes.

2. Description of the Prior Art

Photographic printers typically produce photographic prints from photographic film originals (generally negatives). High intensity light is passed through the negative and imaged on photosensitive print paper. The photographic emulsion layers on the print paper are exposed and subsequently processed to produce a print of the scene contained in the negative.

A critical portion of a photographic printer is the exposure control, which controls the exposure of the photosensitive emulsion layers in order to ensure that the image on the print paper is properly exposed. The exposure control may utilize inputs from several different sources in order to determine the proper exposure.

Most automatic photographic printers measure the optical characteristics of the negatives and classify the negatives based upon these measurements. The types of negatives which can be automatically classified by optical measurements include (1) normal scenes, (2) subject density failures, (3) subject color failures, (4) color failures, (5) density failures, (6) snow scenes and beach/water scenes, (7) landscape scenes, (8) backlit scenes, (9) vertically oriented scenes, and (10) outdoor scenes. In most printers, the negatives containing normal scenes are printed using exposures derived from a method known as "integration-to-gray." With this method, it is assumed that the colors of the scene in the negative will integrate to gray over the print area, since the scene contains approximately equal amounts of red, green and blue.

While integration-to-gray results in proper exposure of the majority of all prints, the other types of scenes which can be automatically classified typically may not be correctly exposed by integration-to-gray. As a result, the exposure control of the photographic printer corrects or adjusts the exposures depending upon which type of scene is contained in the negative.

The frequency of particular types of scenes in an average population of negatives can vary significantly by season and geographical location. For example, during the winter months in the northern portions in the United States, a much larger number of snow scenes will be present than in other times of the year. Similarly, very few snow scenes are likely to be found in a population of negatives from the southern United States at any time during the year.

Because the population of negatives handled by a photofinisher will vary, it is advantageous to permit the photofinisher to adjust the sensitivity of the exposure control system to certain types of scenes. Thus, if the photofinisher has determined that the negative population will contain an abnormally high number of a particular type of scene, the photofinisher may desire to adjust the exposure control so that it is more sensitive to that particular type of scene.

Unfortunately, the classification of negatives into various types of scenes is a rather complex process in most photographic printers. The process typically involves various threshholds and other criteria for classifying negatives based upon the optical measurements. For example, in the photographic printer described in U.S. Pat. Nos. 4,168,120 and 4,168,121, sensitivity of a photographic printer to snow/beach negatives can be adjusted by the operator by varying a "SNRA" threshhold, which is a numerical value ranging from about 30 to about 70. A change in the SNRA threshhold results in a nonlinear change in the sensitivity of the exposure control to snow/beach type scenes, and also affects the sensitivity to others types of scenes in a converse fashion. As a result, the photofinisher, when changing the SNRA threshhold, must have a rather sophisticated understanding of the operation of the printer in order to achieve the desired change in sensitivity to snow/beach scenes.

SUMMARY OF THE INVENTION

The present invention is an improved exposure control system for photographic printers. The exposure control system measures the optical characteristics of photographic film originals and classifies those film originals having characteristics indicating that they contain a particular type of scene. A user-selectable sensitivity control permits adjustment of the sensitivity of the identification in essentially a linear fashion.

The present invention, therefore, permits the user to make adjustments to the sensitivity of the exposure control system to particular types of film originals in a simple and straightforward manner. The user is not required to remember complex relationships between various threshhold values and other criteria in order to increase or decrease sensitivity in identification of a particular type of scene.

In one preferred embodiment of the present invention, a user-selectable sensitivity control controls the sensitivity of the exposure control system to backlit, vertical-oriented, and outdoor scenes. The maximum sensitivity setting for backlit, vertical, and outdoor scenes is particularly suitable for predominantly outdoor film populations, while the minimum sensitivity setting is suitable for predominantly indoor populations. The sensitivity control varies sensitivity in essentially equal steps as the sensitivity control is varied from its minimum to its maximum setting.

DETAILED DESCRIPTION OF THE PREFERRED EMBODIMENTS

Figures 1, 2A, 2B, 2C:
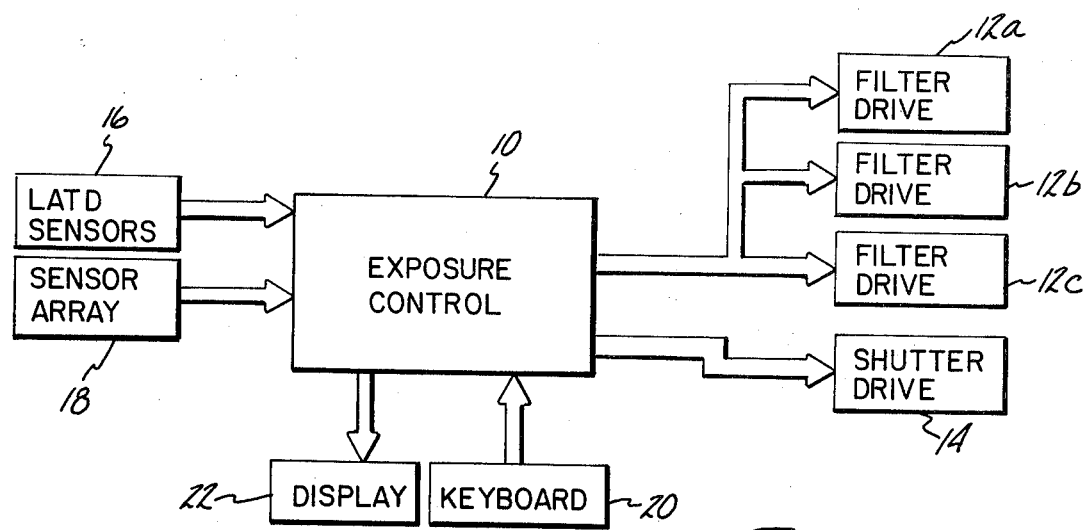
FIG. 1 is a block diagram of an automatic exposure control utilizing the sensitivity control of the present invention.
FIGS. 2A-2C illustrate the sensor array readings used by the exposure control in identifying backlit scenes, vertical scenes and outdoor scenes, respectively.

FIG. 1 shows a block diagram of an exposure control system of a photographic printer utilizing the sensitivity control of the present invention. In the system of FIG. 1, exposure control 10 controls the red, green and blue exposures through red, green, blue filter drive 12 and shutter drive 14. During a typical exposure cycle, exposure control 10 actuates shutter drive 14 to drive a shutter out of the light path. The red, green and blue exposures are terminated by exposure control 10 by actuating filter drives 12a, 12b and 12c, respectively. Each filter drive controls the position of a subtractive filter for a particular color channel.

Exposure control 10 receives input signals from large area transmission density (LATD) sensors 16, from sensor array 18, and from keyboard 20. The red, green and blue exposure times are determined and controlled by exposure control 10 as a function of the LATD sensor signals, the sensor array signals, and any inputs which have been provided by the user through keyboard 20.

LATD sensors 16 sample the light transmittted by the negative either prior to or during exposure. LATD sensors 16 measure the average density of the negative in each of the three color channels (red, green and blue).

Sensor array 18 measures optical transmission of the negative at individual defined areas, as opposed to the average or integrated measurement provided by the LATD sensors. Sensor array 18 measures either density or color at each of the individual defined areas. If sensor array 18 is a color sensing array, LATD sensors 16 may not be necessary in classifying negatives and determining proper exposure.

Exposure control 10 supplies signals which control display 22. Control information, instructions and other messages are provided by display 22 as a function of the signals from exposure control 10.

In a preferred embodiment of the present invention, exposure control 10 includes a microcomputer which stores exposure control information and stores various threshholds and criteria which are used in classifying each negative based upon the signals received from LATD sensors 16 and sensor array 18. Exposure control 10 classifies each negative by performing a series of classification tests based upon the signals provided by LATD sensors 16 and sensor array 18. In this embodiment, exposure control 10 continues the tests until the negative meets the classification criteria for a particular type of scene, and then does not proceed to any further tests.

First, exposure control 10 determines whether a negative is an over/under reject. In other words, exposure control 10 determines whether the negative is so grossly overexposed or underexposed that it will not be printed properly under any conditions. Those negatives classified as an over/under reject are not printed.

Second, exposure control 10 determines whether the negative contains a snow or beach scene. This determination is preferably made in the manner described in U.S. Pat. No. 4,168,121, and is a function of (a) density distribution determined by the signals from sensor array 18, (b) the red, green and blue exposure times determined by signals from LATD sensors 16, (c) inputs from keyboard 20, and (d) stored exposure control information. If the negative is classified as a snow/beach scene it is printed as either a normal negative, or is printed with a minus density correction, depending upon the signals from sensor array 18.

Third, if the negative is neither an over/under reject nor a snow/beach scene, exposure control 10 determines whether it is a landscape scene. This determination is made based upon the signals from sensor array 18, and is preferably made in the manner described in U.S. Pat. No. 4,168,120. Negatives which are identified as containing a landscape scene are printed as "normal" negatives. In other words, exposure control 10 provides exposures for landscape scenes which result in integration-to-gray.

Fourth, exposure control 10 determines whether the negative contains a backlit scene. FIG. 2A illustrates a method used in the preferred embodiment of the present invention to identify backlit scenes. In this embodiment, sensor array 18 has a total of twelve sensors arranged in three rows of four sensors each. For the purpose of the backlit scene determination, only ten of the twelve sensor readings are used. Exposure control 10 determines which row of sensors is the "sky row" and which is the "subject row," depending on whether the negatives are notched on the top or on the bottom. Exposure control 10 uses all four readings from the sky row (which are designated $Z_3$ through $Z_6$ in FIG. 2A), the two outermost readings from the middle row (which are designated $Z_2$ and $Z_7$), and all four readings from the subject row (which are designated $Z_1$, $W_1$, $W_2$ and $Z_8$). The sensor readings are converted to digital values, and a BACKLIT DIFFERENCE is determined by the following relationship:

$$\text{BACKLIT DIFFERENCE} = [Z_1 + Z_2 + Z_3 + \ldots Z_8)/8] - [(W_1 + W_2)/2]$$

The amount of negative density correction provided depends upon the magnitude and sign of the BACKLIT DIFFERENCE. If the BACKLIT DIFFERENCE is negative, or if it is less than a predetermined positive value, exposure control 10 determines that the negative does not contain a backlit scene, and proceeds with further classification and identification procedures. If the negative is classified as containing a backlit scene, the amount of negative density correction is dependent upon the value of the BACKLIT DIFFERENCE. As will be described in further detail later, the present invention provides a user-controlled sensitivity control through keyboard 20 and display 22 which controls the threshhold at which exposure control 10 identifies a negative as containing a backlit scene, and controls the values of BACKLIT DIFFERENCE required to provide various minus density corrections.

Fifth, exposure control 10 uses signals from sensor array 18 to determine whether the negative contains a vertically oriented scene, which otherwise could be improperly identified as a subject density failure. If exposure control 10 classifies the negative as a vertically oriented scene, the negative is printed as a normal negative using integration-to-gray.

FIG. 2B illustrates one of the two tests which are used by exposure control 10 in identifying vertically oriented scenes. As shown in FIG. 2B, exposure control 10 uses the left column of sensor signals (designated $X_1$, $X_2$ and $X_3$) and the right column of sensor readings (designated $Y_1$, $Y_2$ and $Y_3$). Exposure control 10 derives a SIDE-TO-SIDE DIFFERENCE value based upon the following relationship:

$$\text{SIDE-TO-SIDE DIFFERENCE} = |(X_1 + X_2 + X_3) - (Y_1 + Y_2 + Y_3)|$$

In addition to the SIDE-TO-SIDE DIFFERENCE, exposure control 10 also uses the number of "SNRA points," which is a value previously derived by exposure control 10 during the process of determining whether the negative contained a snow/beach scene. The number of SNRA points is the number of density readings from sensor array 10 which fall within a predetermined interval of the maximum density reading. The number of SNRA points, therefore, can range from 0 to 11 when sensor array 18 is a 12-sensor array. If the SIDE-TO-SIDE DIFFERENCE and the SNRA points meet certain predetermined criteria, exposure control 10 determines that the negative is a vertically oriented scene, and causes the negative to be printed as a normal negative.

Sixth, exposure control 10 determines whether the negative is an outdoor scene, which otherwise could be incorrectly identified as a subject density failure. FIG. 2C illustrates a preferred embodiment for determining a "FRONT-TO-BACK DIFFERENCE" used by exposure control 10 in identifying outdoor scenes. Exposure control 10 uses sensor readings from the sky row of sensors (designated $A_1$, $A_2$, $A_3$ and $A_4$) and sensor readings from the subject row (designated $B_1$, $B_2$, $B_3$ and $B_4$). Exposure control 10 determines the FRONT-TO-BACK DIFFERENCE by the following relationship:

$$\text{FRONT-TO-BACK DIFFERENCE} = |(A_1+A_2+A_3+A_4)-(B_1+B_2+B_3+B_4)|$$

If the FRONT-TO-BACK DIFFERENCE exceeds a predetermined threshhold value, exposure control 10 identifies the negative as an outdoor scene, and causes the negative to be printed as a normal negative.

Seventh, if a negative has not been identified as any of the previous types of scenes, exposure control 10 then determines whether the negative is a subject density failure. In one preferred embodiment of the present invention, the classification of negatives as subject density failures, and the amount of plues (+) density correction provided to subject density failure negatives is provided in the manner described in U.S. Pat. No. 4,168,120.

In a preferred embodiment of the present invention, the sensitivity of exposure control 10 to backlit, vertical and outdoor scenes is controlled through the use of a single parameter which may be selected and modified by the photofinisher through keyboard 20. In this embodiment, the sensitivity control parameter is designated "Vertical/Backlit Value" and is displayed, upon request by keyboard 20, on display 22. In the preferred embodiment, the Vertical/Backlit Value is an integer which ranges from −3 to +3, with zero (0) being a nominal starting value. A vertical/backlit value of +3 provides the greatest sensitivity to backlit, vertical, and outdoor scenes, and is suitable for predominantly outdoor negative populations. A −3 value minimizes the sensitivity of exposure control 10 to backlit, vertical and outdoor scenes, and results in the classification by exposure control 10 of a greater number of negatives as subject density failures. As a result, a −3 value is suitable for predominantly indoor negative populations. Each step from −3 to +3 is a smooth change in degree of sensitivity to backlit, vertical and outdoor scenes. The sensitivity control of the present invention, therefore, allows the photofinisher to select a sensitivity which is suitable to the particular negative population. Thus as seasons change, the photofinisher can compensate for the resulting changes in negative population.

In the preferred embodiment of the present invention, exposure control 10 stores seven different sets of backlit, vertical and outdoor criteria used in identifying these types of scenes. Each set of criteria is assigned to one of the seven possible vertical/backlit values. Table 1 illustrates the seven sets of parameters associated with the vertical backlit values. As illustrated in Table 1, the +3 vertical backlit value provides the lowest threshholds for identifying backlit, vertical and outdoor scenes, and the −3 vertical backlit value provides the highest threshholds. In fact, in the case of −3 vertical backlit value, exposure control 10 will not identify any negatives as containing vertical scenes.

TABLE 1

| V/B VALUE | BACKLIT DIFFERENCE | CORRECTION | SIDE-TO-SIDE DIFFERENCE AND SNRA POINT COUNT NECESSARY FOR NEGATIVE TO BE CLASSIFIED N | | FRONT-TO-BACK DIFFERENCE FOR N | |
|---|---|---|---|---|---|---|
| +3 | +24 to +33 | −.5 | | | | |
|    | +34 to +43 | −1.0 | ≧±90 | N | | |
|    | +44 to +53 | −1.5 | | | ≧+104 | N |
|    | ≧+54 | −2.0 | | | | |
| +2 | +28 to +36 | −.5 | | | | |
|    | +37 to +45 | −1.0 | ≧±140 | N | | |
|    | +46 to +53 | −1.5 | or ≧±90 AND ≦±139 AND 2 SNRA Pts. | N | ≧+107 | N |
|    | ≧+54 | −2.0 | | | | |
| +1 | +32 to +38 | −.5 | | | | |
|    | +39 to +45 | −1.0 | ≧±160 | N | | |
|    | +46 to +53 | −1.5 | or ≧+130 AND ≦±159 AND 2 SNRA Pts. | N | ≧±110 | N |
|    | ≧+54 | −2.0 | or ≧±90 AND ≦±129 AND 3 SNRA pts. | N | | |
| 0  | +36 to +40 | −.5 | | | | |
|    | +41 to +46 | −1.0 | ≧±160 | N | | |
|    | +47 to +53 | −1.5 | or ≧±90 AND ≦±159 AND 3 SNRA Pts. | N | ≧±113 | N |
|    | ≧54 | −2.0 | | | | |
| −1 | +40 to +44 | −.5 | | | | |
|    | +45 to +49 | −1.0 | ≧±160 | N | | |
|    | +50 to +54 | −1.5 | or ≧±105 AND ≦±159 AND 3 SNRA Pts. | N | ≧±116 | N |
|    | ≧+55 | −2.0 | | | | |
| −2 | +44 to +48 | −.5 | | | | |
|    | +49 to +53 | −1.0 | ≧±190 | N | | |
|    | +54 to +58 | −1.5 | or ≧±105 AND ≦±189 AND 3 SNRA Pts. | N | ≧±119 | N |
|    | ≧+59 | −2.0 | | | | |
| −3 | +48 to +52 | −.5 | | | | |
|    | +53 to +58 | −1.0 | OFF, No Side-to-Side Differ- | | ≧±121 | N |

TABLE 1-continued

| V/B VALUE | BACKLIT DIFFERENCE | CORRECTION | SIDE-TO-SIDE DIFFERENCE AND SNRA POINT COUNT NECESSARY FOR NEGATIVE TO BE CLASSIFIED N | FRONT-TO-BACK DIFFERENCE FOR N |
|---|---|---|---|---|
| | | | ence Assigns any negative to | N |

In conclusion, the present invention permits the photofinisher to adjust the sensitivity of the exposure control system to particular types of scenes in a simple and easily understandable manner. The photofinisher is not required to have a detailed understanding of the internal parameters and criteria used by the exposure control system in identifying particular types of scenes. Instead, the operator is provided with a sensitivity control which varies sensitivity of the exposure control to particular types of scenes in a linear fashion.

Although the present invention has been described with reference to preferred embodiments, workers skilled in the art will recognize that changes may be made in form and detail without departing from the spirit and scope of the invention. For example, the present invention has been described in the context of a particular photographic printer which identifies and classifies certain types of scenes. The present invention, however, can be used in conjunction with other systems which identify the same types of scenes using different types of criteria or which identify other types of scenes which have not been discussed in detail in this specification. Similarly, the present invention is usable in separate negative classification equipment used in conjunction with a photographic printer, as well as being usable as part of the printer itself. Although the sensitivity control which has been specifically described controls sensitivity to backlit, vertical and outdoor scenes, it is equally useful for controlling sensitivity of other types of scenes. In fact, it is particularly advantageous to provide several sensitivity controls for different types of scenes, so that the operator can individually adjust the sensitivity of the exposure controls to these various scenes, so as to tailor the sensitivity of the exposure control to the particular negative population which the photofinisher expects to be printed.

What is claimed is:

1. Apparatus for identifying and classifying photographic film originals into various types of scenes, the apparatus comprising:
   means for measuring optical characteristics of film originals;
   means for classifying film originals based upon the measured optical characteristics; and
   user-selectable sensitivity control means for adjusting the sensitivity of the means for classifying to a particular type of scene in an essentially linear fashion.

2. The apparatus of claim 1 and further comprising:
   means for storing a plurality of sets of classification parameters which provide different levels of sensitivity to particular types of scenes;
   wherein the user-selectable sensitivity control means selects one of the sets of classification parameters; and
   wherein the means for classifying film originals classifies the film originals based upon the measured optical characteristics and the selected set of classification parameters.

3. The apparatus of claim 2 wherein each set of classification parameters has an associated numerical value, and wherein the user-selectable sensitivity control means selects one of the sets of classification parameters by its associated numerical value.

4. The apparatus of claim 3 wherein the sensitivity to particular types of scenes increases with increasing numerical value.

5. The apparatus of claim 4 wherein the change in sensitivity from one set of classification parameters to the next is an essentially constant increment.

6. The apparatus of claim 1 and further comprising:
   exposure control means for controlling exposures of the film originals in a photographic printer as a function of the classification of the film originals.

7. The apparatus of claim 1 wherein the user-selectable sensitivity control means adjusts sensitivity of the means for classifying to backlit scenes.

8. The apparatus of claim 1 wherein the user-selectable sensitivity control means adjusts sensitivity of the means for classifying to vertical oriented scenes.

9. The apparatus of claim 1 wherein the user-selectable sensitivity control means adjusts sensitivity of the means for classifying to outdoor scenes.

10. The apparatus of claim 1 wherein the user-selectable sensitivity control means adjusts sensitivity of the means for classifying to backlit, vertical oriented and outdoor scenes.

11. The apparatus of claim 1 wherein the user-selectable sensitivity control means varies sensitivity to particular types of scenes in essentially equal steps as it is varied from a minimum to a maximum setting.

12. Apparatus for identifying and classifying photographic film originals by types of scenes contained in the photographic film originals, the apparatus comprising:
   means for measuring optical characteristics of photographic film originals;
   means for storing a plurality of sets of classification parameters which provide different levels of sensitivity to particular types of scenes;
   user-selectable sensitivity control means for selecting one of the sets of classification parameters; and
   means for classifying the photographic film originals based upon the measured optical characteristics and the selected set of classification parameters.

13. The apparatus of claim 12 wherein each set of classification parameters has an associated numerical value, and wherein the user-selectable sensitivity control means selects one of the sets of classification parameters by its associated numerical value.

14. The apparatus of claim 13 wherein the levels of sensitivity to particular types of scenes vary in essentially equal steps from the set of classification parameters having a minimum associated numerical value to a set of classification parameters having a maximum associated numerical value.

15. The apparatus of claim 12 wherein the sets of classification parameters provide different levels of sensitivity to backlit scenes.

16. The apparatus of claim 12 wherein the sets of classification parameters provide different levels of sensitivity to vertical oriented scenes.

17. The apparatus of claim 12 wherein the sets of classification parameters provide different levels of sensitivity to outdoor scenes.

18. The apparatus of claim 12 wherein the sets of classification parameters provide different levels of sensitivity to backlit, vertical oriented and outdoor scenes.

19. The apparatus of claim 12 and further comprising:
  exposure control means for controlling exposure in a photographic printer as a function of the classification of the photographic film originals.

* * * * *